United States Patent
Li et al.

(10) Patent No.: US 10,743,070 B2
(45) Date of Patent: Aug. 11, 2020

(54) FAST CHANNEL CHANGE FOR A SET TOP BOX BASED ON CHANNEL VIEWING BEHAVIORS

(71) Applicant: AT&T Intellectual Property I, L.P., Atlanta, GA (US)

(72) Inventors: Quan Li, Alpharetta, GA (US); Gregory Cooke, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/828,493

(22) Filed: Dec. 1, 2017

(65) Prior Publication Data

US 2019/0174188 A1    Jun. 6, 2019

(51) Int. Cl.
*H04N 21/466*    (2011.01)
*H04N 21/442*    (2011.01)
(Continued)

(52) U.S. Cl.
CPC ........... *H04N 21/4662* (2013.01); *G06N 3/08* (2013.01); *G06N 5/048* (2013.01); *H04N 21/4384* (2013.01); *H04N 21/44213* (2013.01); *H04N 21/4532* (2013.01); *H04N 21/4826* (2013.01); *G06N 7/02* (2013.01)

(58) Field of Classification Search
CPC ...................... H04N 21/2221; H04N 21/812
See application file for complete search history.

(56) References Cited

U.S. PATENT DOCUMENTS

| 5,410,344 A | 4/1995 | Graves |
| 6,115,740 A * | 9/2000 | Mizutani ............ H04N 7/17336 348/E7.073 |

(Continued)

FOREIGN PATENT DOCUMENTS

| EP | 1775953 A1 | 4/2007 |
| WO | 2014067566 A1 | 5/2014 |
| WO | 2017145109 A1 | 8/2017 |

OTHER PUBLICATIONS

Ahmad, Muhammad Zeeshan et al., "Prediction-based channel zapping latency reduction techniques for IPTV systems—A survey", Emerging Technologies, 2009. ICET 2009. International Conference on. IEEE, 2009.

(Continued)

*Primary Examiner* — Joshua D Taylor
(74) *Attorney, Agent, or Firm* — Guntin & Gust, PLC; Andrew C. Gust

(57) ABSTRACT

Aspects of the subject disclosure may include, for example, a method comprising obtaining channel change data for a media processor coupled to a gateway; the channel change data relates to channel changes requested during recurring time periods. A channel viewing profile is determined for the media processor, and a channel viewing map is generated corresponding to a portion of the channel viewing profile for one of the time periods; the channel viewing map comprises a list of predicted channels likely to be requested during a recurrence of the time period. Signals are provided to the media processor corresponding to the predicted channels, each of the predicted channels thereby being available for an instant channel change responsive to a channel change request. Other embodiments are disclosed.

20 Claims, 9 Drawing Sheets

(51) Int. Cl.
*H04N 21/45* (2011.01)
*H04N 21/482* (2011.01)
*H04N 21/438* (2011.01)
*G06N 5/04* (2006.01)
*G06N 3/08* (2006.01)
*G06N 7/02* (2006.01)

(56) References Cited

U.S. PATENT DOCUMENTS

| | | | |
|---|---|---|---|
| 6,418,424 | B1 | 7/2002 | Hoffberg et al. |
| 6,927,806 | B2 | 8/2005 | Chan et al. |
| 7,017,172 | B2 | 3/2006 | Schaffer et al. |
| 7,370,342 | B2 | 5/2008 | Ismail et al. |
| 7,698,236 | B2 | 4/2010 | Cox et al. |
| 8,245,251 | B2 | 8/2012 | DePietro et al. |
| 8,510,787 | B2 | 8/2013 | Agrawal et al. |
| 8,533,760 | B1 | 9/2013 | Lakin et al. |
| 8,769,568 | B2 | 7/2014 | Depietro et al. |
| 8,799,936 | B2 | 8/2014 | Choi et al. |
| 8,804,042 | B2 | 8/2014 | Boss et al. |
| 8,839,278 | B2 | 9/2014 | Wang et al. |
| 8,850,465 | B2 | 9/2014 | Humpleman et al. |
| 8,856,282 | B2 | 10/2014 | Kim et al. |
| 9,277,264 | B2 | 3/2016 | Humpleman et al. |
| 9,509,954 | B2 | 11/2016 | Verzijp et al. |
| 9,544,526 | B2 | 1/2017 | Ellis |
| 2002/0016971 | A1* | 2/2002 | Berezowski ..... G08B 13/19693 725/105 |
| 2002/0144279 | A1* | 10/2002 | Zhou ................. H04N 7/17336 725/95 |
| 2002/0166119 | A1* | 11/2002 | Cristofalo ............ H04N 5/4401 725/34 |
| 2003/0161395 | A1 | 8/2003 | Byers et al. |
| 2004/0111741 | A1* | 6/2004 | DePietro ................. H04N 5/50 725/34 |
| 2006/0075428 | A1 | 4/2006 | Farmer et al. |
| 2007/0053513 | A1* | 3/2007 | Hoffberg ............ G06K 9/00369 380/201 |
| 2008/0155593 | A1* | 6/2008 | Kim ........................ H04N 5/44 725/38 |
| 2009/0165043 | A1* | 6/2009 | Ou ..................... H04N 21/2221 725/38 |
| 2013/0293787 | A1 | 11/2013 | Van Wallendael et al. |
| 2014/0046983 | A1* | 2/2014 | Galloway ......... G06F 17/30958 707/798 |
| 2014/0173652 | A1* | 6/2014 | Patel ................... H04N 21/812 725/34 |
| 2017/0064215 | A1* | 3/2017 | Cho ........................ H04N 5/268 |
| 2017/0098197 | A1* | 4/2017 | Yu ...................... G06Q 10/1095 |
| 2017/0180773 | A1 | 6/2017 | Li et al. |

OTHER PUBLICATIONS

Kim, Yuna et al., "Reducing IPTV channel zapping time based on viewer's surfing behavior and preference", Broadband Multimedia Systems and Broadcasting, 2008 IEEE International Symposium on. IEEE, 2008.

Lee, Chae Young et al., "Reducing channel zapping time in IPTV based on user's channel selection behaviors", IEEE transactions on broadcasting 56.3, 2010, 321-330.

* cited by examiner

100

Channel Viewing Map
STB 1
Nodes: Thursday time periods

| | 5-7 AM | 7-9 AM | 9 AM-NOON | 12-4 PM | 4-6 PM | 6-8 PM | 8-10 PM | 10 PM-MIDNITE | 12-5 AM |
|---|---|---|---|---|---|---|---|---|---|
| ESPN | 16 | 5 | 0 | 0 | 6 | 36 | 60 | 30 | 0 |
| Cartoon Network | 5 | 5 | 0 | 26 | 35 | 10 | 0 | 0 | 0 |
| CNN | 10 | 5 | 30 | 10 | 0 | 30 | 20 | 20 | 0 |
| HBO | 0 | 5 | 70 | 30 | 0 | 0 | 30 | 60 | 10 |
| CBS | 30 | 40 | 30 | 50 | 30 | 30 | 10 | 10 | 0 |
| D-Server | 1 | 1 | 1 | 1 | 2 | 2 | 3 | 2 | 1 |

FAST CHANNEL CHANGE FOR A SET TOP BOX BASED ON CHANNEL VIEWING BEHAVIORS

FIELD OF THE DISCLOSURE

The subject disclosure relates to video distribution on a network, and more particularly to a system for facilitating fast channel changes at a customer premises having a gateway and a set top box.

BACKGROUND

In interactive television networks (for example, IPTV networks), user requests for fast channel changes can cause significant burst loads on distribution servers (D-servers), particularly on the hour and half-hour when numerous users request channel changes at the same time.

BRIEF DESCRIPTION OF THE DRAWINGS

Reference will now be made to the accompanying drawings, which are not necessarily drawn to scale, and wherein:

FIG. 3 illustrates a channel viewing map corresponding to a portion of the network of FIG. 2;

DETAILED DESCRIPTION

Figure 1:
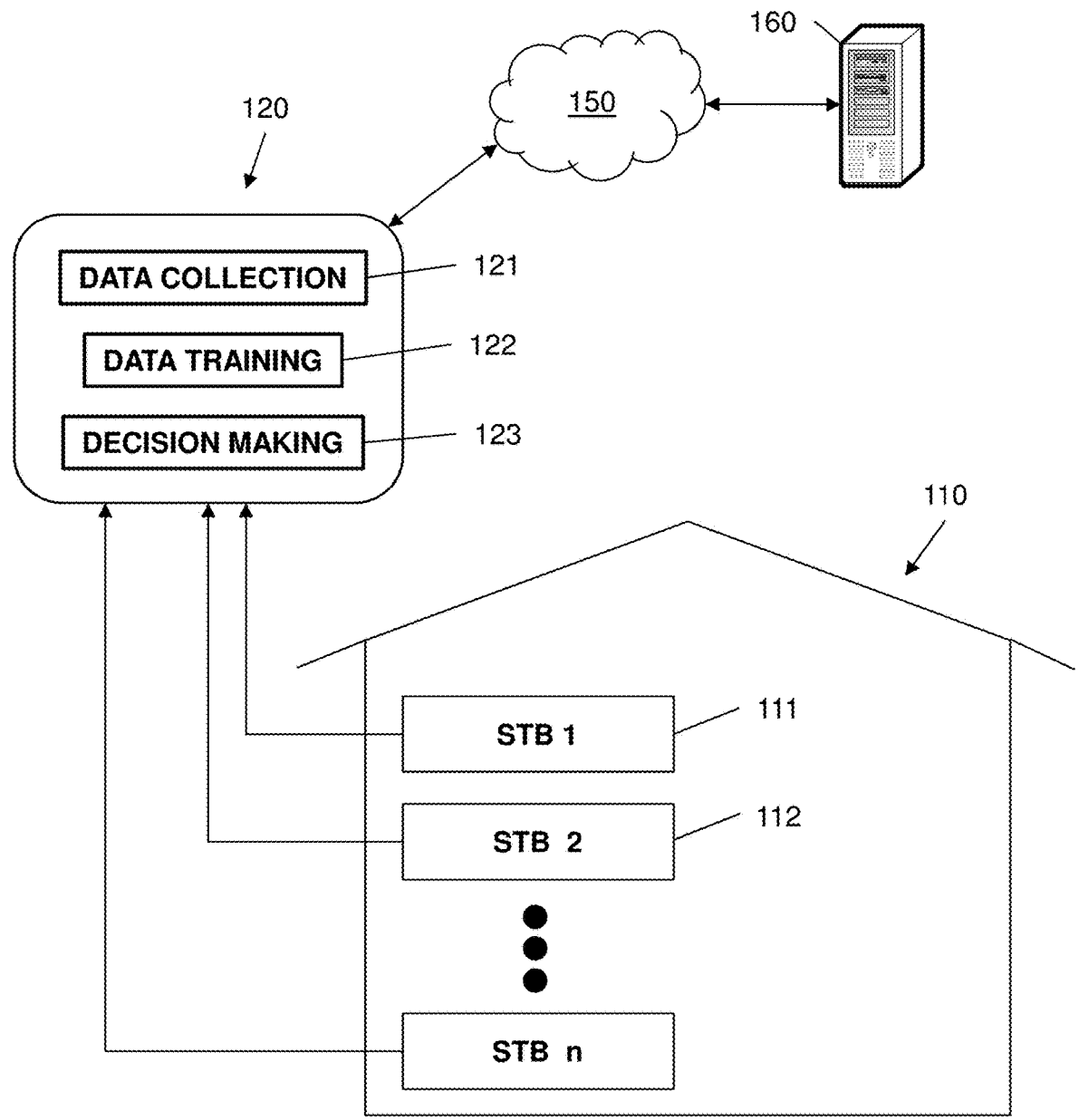
FIG. 1 schematically illustrates a customer premises including set top boxes (STBs) and a residential gateway (RG), in accordance with an embodiment of the disclosure.

The subject disclosure describes, among other things, illustrative embodiments for facilitating fast channel changes by predicting channel change requests using a channel viewing map for specific time periods. Other embodiments are described in the subject disclosure.

One or more aspects of the subject disclosure include a method comprising obtaining, by a processing system including a processor at a gateway, channel change data for a media processor coupled to the gateway; the channel change data relates to channel changes requested via the media processor during each of a plurality of predefined recurring time periods. The method also comprises determining a channel viewing profile for the media processor, based on the channel change data; and generating a channel viewing map corresponding to a portion of the channel viewing profile for a time period of the plurality of time periods; the channel viewing map comprises a list of predicted channels likely to be requested during a subsequent occurrence of the time period, the predicted channels comprise a portion of channels available at the media processor, and the list has a ranking of the predicted channels according to a likelihood of being requested during the subsequent occurrence of the time period. The method also comprises providing signals to the media processor corresponding to the predicted channels, each of the predicted channels thereby being available for an instant channel change responsive to a channel change request. The method further comprises determining a current channel viewing map based on channel change requests during a current time period; comparing the current channel viewing map with the list of predicted channels; and generating a new channel viewing map, responsive to a decision to generate the new channel viewing map in accordance with detecting a change in the ranking based on the comparing.

One or more aspects of the subject disclosure include a device comprising a processing system including a processor and a memory that stores executable instructions that, when executed by the processing system, facilitates performance of operations. The operations comprise obtaining channel change data for a media processor coupled to a gateway, the channel change data relating to channel changes requested via the media processor during each of a plurality of predefined recurring time periods. The operations also comprise determining a channel viewing profile for the media processor, based on the channel change data, and generating a neural network for the media processor and the time periods; each node of the network comprises a channel viewing map corresponding to a portion of the channel viewing profile for a time period of the plurality of time periods, the node accordingly comprising a list of predicted channels likely to be requested during a subsequent occurrence of the time period, the predicted channels comprising a portion of channels available at the media processor, the list having a ranking of the predicted channels according to a likelihood of being requested during the subsequent occurrence of the time period. The operations also comprise providing signals to the media processor corresponding to the predicted channels, each of the predicted channels thereby being available for an instant channel change responsive to a channel change request. The operations further comprise determining a current channel viewing map based on channel change requests during a current time period; comparing the current channel viewing map with the list of predicted channels; and generating a new channel viewing map, responsive to a decision to generate the new channel viewing map in accordance with detecting a change in the ranking based on the comparing.

One or more aspects of the subject disclosure include a non-transitory machine-readable medium comprising executable instructions that, when executed by a processing system including a processor, facilitate performance of operations. The operations comprise obtaining channel change data for a media processor coupled to a gateway, the channel change data relating to channel changes requested via the media processor during each of a plurality of predefined recurring time periods. The operations also comprise determining a channel viewing profile for the media processor, based on the channel change data, and generating a neural network for the media processor and the time periods; each node of the network comprises a channel viewing map corresponding to a portion of the channel viewing profile for a time period of the plurality of time periods, the node accordingly comprising a list of predicted channels likely to be requested during a subsequent occurrence of the time period, the predicted channels comprising a portion of channels available at the media processor, the list having a ranking of the predicted channels according to a likelihood of being requested during the subsequent occurrence of the time period. The operations also comprise providing signals to the media processor corresponding to the predicted channels, each of the predicted channels thereby being available for an instant channel change responsive to a channel change request. The operations further comprise determining a current channel viewing map based on channel change requests during a current time period; comparing the current channel viewing map with the list of predicted channels; and generating a new channel viewing map, responsive to a decision to generate the new channel viewing map in accordance with detecting a change in the ranking based on the comparing.

FIG. 1 schematically illustrates an embodiment 100 of the disclosure in which a customer premises includes one or more set top boxes (STBs) coupled to a gateway. In this embodiment, internet protocol (IP) services, including internet protocol television (IPTV), for a customer premises 110 are accessed via a residential gateway (RG) 120. The RG provides an interface between customer premises equipment (for example, STB1 111, STB2 112, . . . STBn) and an IPTV provider system. The IPTV provider system includes a server 160 delivering content to the RG via a network 150. It will be appreciated that the STBs may be installed at any of a variety of locations, including without limitation the exterior or interior of a residence (home, apartment building, etc.), or the exterior or interior of a commercial establishment. Furthermore, the RG may perform a variety of additional functions, including without limitation reformatting of content and providing network performance data with or without user input.

The customer subscribes to the provider system at a defined service level. Based on the service level, the customer is provided with bandwidth resources for handling IPTV signals; based on the bandwidth, the provider system sends TV channels to the STBs at the customer premises.

In this embodiment, the RG 120 and the set top boxes form an adaptive artificial intelligence (AI) system; the RG includes a data collection unit 121, a data training unit 122 and a decision making unit 123. The viewer's channel request history and viewing history are analyzed to produce a channel viewing map, which is used to predict the viewer's channel change requests at various times of day or day of the week.

In this embodiment, the AI system predicts that a customer will request a change to a particular channel at a certain time, and buffer video content for the predicted channel in advance of the request. The system then can perform a fast channel change (that is, channel switching with low latency) even at peak channel change request times (for example, on the hour and half-hour).

The data collection unit 121 collects data obtained by an STB of the customer premises regarding TV programs requested at various times of day and days of the week. In each time period (for example, 5 a.m. to 7 a.m. on Thursdays), the data collection unit collects the channel request history and channel stay time (that is, which channels were requested during the time period, and how long a particular channel was viewed before a change to a different channel was requested). In this embodiment, a request for a change to a channel is recorded only for a channel that is viewed for a minimum time period (for example, a minimum stay time of 3 minutes). In another embodiment, the data for a channel change during a time period includes an identifier for the user requesting the channel change.

Channel change data is obtained in real time on an ongoing basis by each of the STBs; the collected data is used to construct a channel viewing map for one or more STBs, covering a specific time period.

Figure 2:
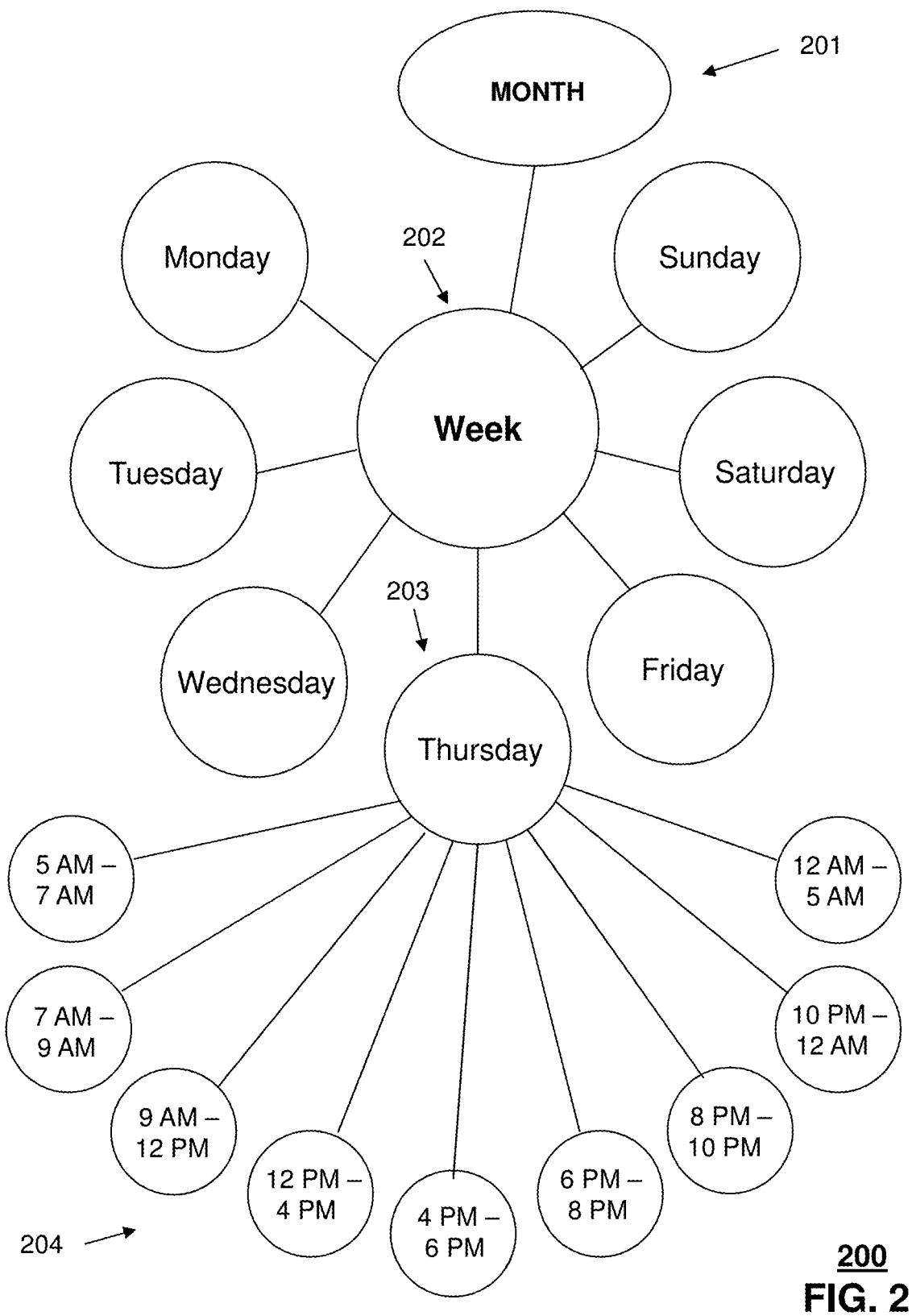
FIG. 2 illustrates a portion of a neural network node map with a user's channel viewing behavior, in accordance with an embodiment of the disclosure.

In an embodiment, the channel change data is organized as a neural network; each node of the network corresponds to the channel viewing map for a particular STB during a specific, recurring time period. FIG. 2 schematically illustrates a portion 200 of a network according to this embodiment of the disclosure. The neural network includes data for a month 201, including a week 202 of that month, which includes a day 203 of that week. In this embodiment, channel viewing data for each day is organized according to nine time periods 204.

The data training unit 122 uses the data from the STB and the data collection unit to train the neural network nodes. In this embodiment, the training is performed for the seven days of the week and for nine time periods of each day; accordingly, one week is required to perform one instance of training. A channel viewing map is generated by the AI system at the RG for each day of the week, subdivided into time periods. For example, since the time period "Thursday 5-7 a.m." recurs weekly, the data training unit can accumulate channel change data for this time period over a period of weeks; as data training progresses, the customer's channel viewing behavior becomes predictable at an increasing level of confidence. In an embodiment, the channel viewing maps are analyzed by the AI system of the RG to generate a list of predicted channels for each time period.

In a further embodiment, the channels in the list are ranked according to the likelihood that a given channel will be requested during the time period. This ensures, among other things, that in a situation where distribution resources are limited, the channel most likely to be requested is made available to the customer.

FIG. 3 illustrates a channel viewing map 300 according to an embodiment of the disclosure. As shown in FIG. 3, a day of the week is divided into time periods 310, not necessarily all the same length. The channel viewing map is analyzed to determine the five channels 320 with the longest viewing time in each time period throughout the day; these channels are shown in FIG. 3 with the number of minutes each channel was viewed during the various time periods. An entry of 0 minutes indicates that the channel was not viewed during the time period for longer than the minimum stay time (e.g. 3 minutes); that is, a record of a channel change to a channel where the stay time is less than the minimum is discarded. In addition, the RG can predict a number 321 of D-servers required to be allocated to the customer in each time period.

Using a prediction based on the channel viewing map, the RG can cause a limited number of channels to be pre-loaded to the STB (in this example, up to five channels). If the customer requests a change to one of the predicted channels, the requested channel will thus be immediately available.

In an embodiment, each entry in the channel viewing map having a viewing time greater than 0 minutes also includes a predicted time for the channel change (e.g. at the beginning of the time period, 10 minutes into the time period, etc.).

In an embodiment, the RG sends instructions to the STB to provide a predicted channel at the predicted time, in accordance with the channel viewing map (for example, the highest-ranked channel for a time period at the beginning of the time period), in advance of a customer request for that channel. If the customer does request that channel (in accordance with the prediction), he will perceive that the desired channel change has occurred instantly or nearly so.

In another embodiment, the AI system at the RG can construct a profile for the customer that includes the customer's preferences, based on requested channel changes and specific to a day of the week and time of day. For example, the RG may determine that the customer prefers sports programs during the 8-10 p.m. time period on Thursdays. The RG may then obtain advertisements consistent with those preferences (e.g. from server 160 via network 150) which are then inserted into the content delivered to the customer premises. For example, the customer can agree to receive 30 seconds of advertising related to the program content on a channel that has just been requested, in exchange for a discounted subscription fee.

Figure 4:
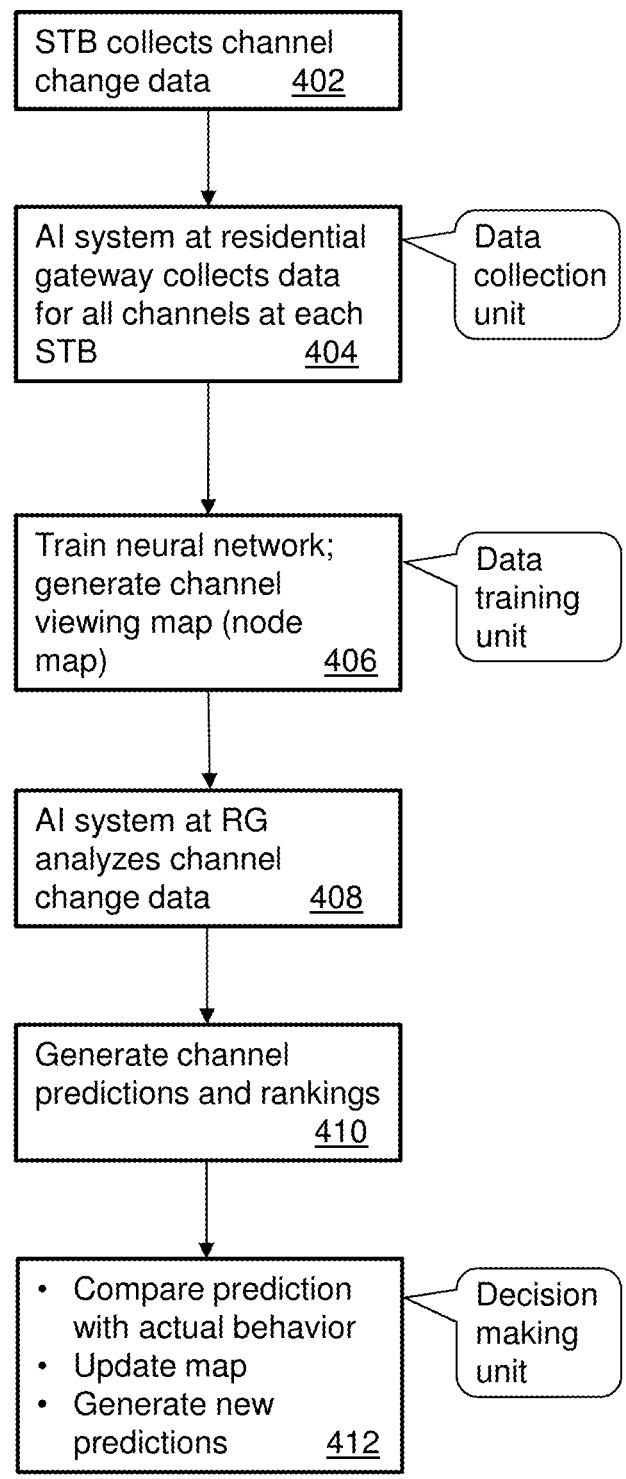
FIGS. 4-5 are flowcharts depicting illustrative embodiments of methods used in portions of the system described in FIG. 1.

FIG. 4 is a flowchart illustrating a method 400 for analyzing and predicting channel changes, in accordance with an embodiment of the disclosure. In step 402, an STB at the customer premises 110 collects data regarding channel changes (for example, recording the time of an input from the customer via a remote control of the STB, and recording an identifier of the channel being requested). The RG 120, which generally is in communication with all of the STBs at the customer premises, collects channel change data from the STBs at the data collection unit 121 (step 404). The data training unit 122 generates a channel viewing map for each of the STBs (step 406). In this embodiment, the channel viewing map is configured as a neural network, with nodes corresponding to time periods for various days of the week.

The channel change data is analyzed by the AI system of the RG (step 408); the AI system generates channel predictions with rankings of the predicted channels for each time period (step 410).

In step 412, the decision making unit 123 determines whether the customer's real-time channel change behavior is different from that predicted by the channel viewing map. If so, the channel viewing map can be updated with new channel rankings and/or new channel identifiers. In an embodiment, the decision making unit uses a fuzzy logic algorithm to decide whether the difference between the actual and predicted channel change behaviors is great enough to cause a new channel viewing map to be generated.

Figure 5:
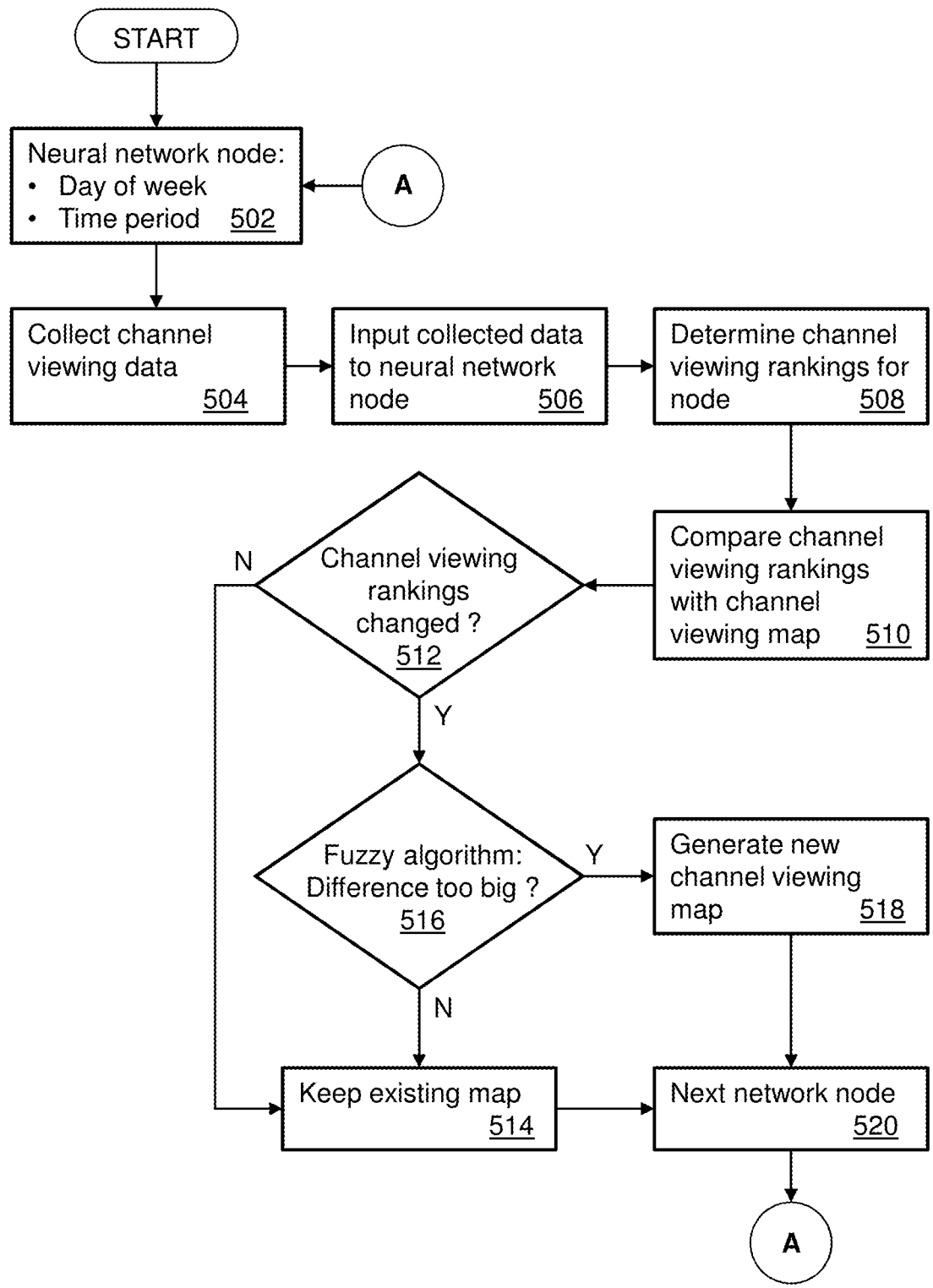

In an embodiment, channel predictions and channel rankings are generated by the data training unit 122 of the RG 120. FIG. 5 is a flowchart illustrating a method 500 performed at the RG, according to this embodiment. The data training unit configures a node of the neural channel change data network channel corresponding to a time period during a given day of the week (step 502). In step 504, channel viewing data obtained in real time from the STB (including which channels are requested during the time period and how long each channel is viewed) is collected at the data collection unit 121. The collected data is added to the network node (step 506), which in general includes channel change data for the same day and time period from previous weeks (historical data).

The data training unit determines a new channel ranking for the node (step 508), based on the new data combined with the historical data. The new channel ranking is then compared with the channel ranking that is based on the existing channel viewing map (step 510). In this embodiment, the decision making unit 123 determines whether the channel ranking has changed as a result of adding the new data (step 512). If not, the existing map is retained (step 514) and channel change data is collected in the next time period (step 520).

If the channel ranking has changed, the decision making unit determines whether a new channel viewing map should be generated (step 516). In this embodiment, a fuzzy algorithm is used to decide whether to generate a new channel viewing map. (For example, a new map might not be generated if the two top-ranked channels switch places; however, a new map might be generated if one of the five ranked channels drops off the list and is replaced by a new channel.) Based on the result of the fuzzy algorithm, the existing map is retained (step 514) or a new channel viewing map is generated (step 518). When the time period ends, real-time channel change data is collected for the next time period (step 520).

While for purposes of simplicity of explanation, the respective processes are shown and described as a series of blocks in FIGS. 4-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
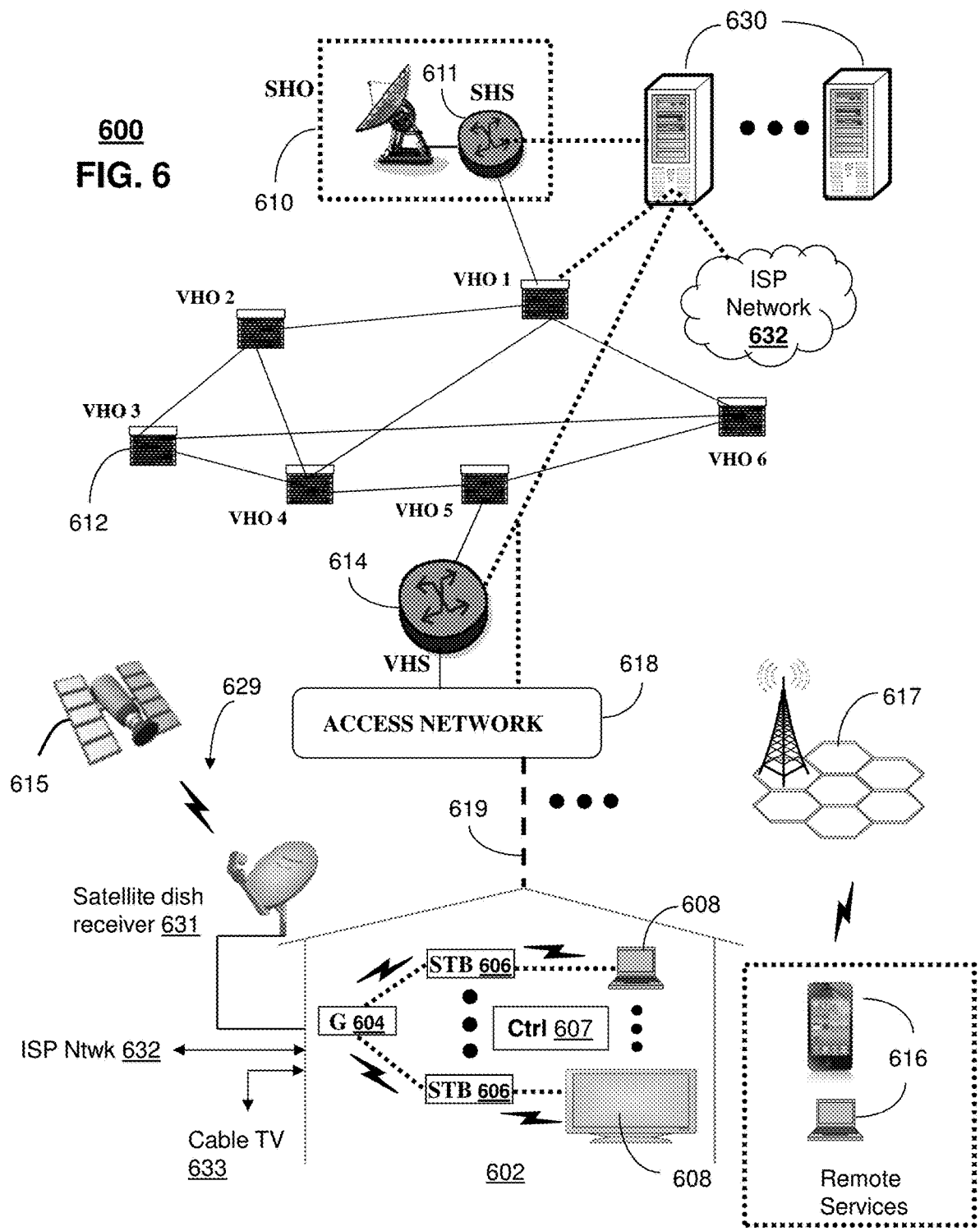
FIGS. 6-7 depict illustrative embodiments of communication systems that provide media services to the customer premises of FIG. 1.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with the system shown in FIG. 1 as another representative embodiment of communication system 600. For instance, one or more devices illustrated in the communication system 600 of FIG. 6 can comprise a processing system including a processor and a memory that stores executable instructions that, when executed by the processing system, facilitates performance of operations. The operations can comprise obtaining channel change data for a media processor coupled to a gateway, the channel change data relating to channel changes requested via the media processor during each of a plurality of predefined recurring time periods. The operations can also comprise determining a channel viewing profile for the media processor, based on the channel change data, and generating a neural network for the media processor and the time periods; each node of the network comprises a channel viewing map corresponding to a portion of the channel viewing profile for a time period of the plurality of time periods, the node accordingly comprising a list of predicted channels likely to be requested during a subsequent occurrence of the time period, the predicted channels comprising a portion of channels available at the media processor, the list having a ranking of the predicted channels according to a likelihood of being requested during the subsequent occurrence of the time period. The operations can also comprise providing signals to the media processor corresponding to the predicted channels, each of the predicted channels thereby being available for an instant channel change responsive to a channel change request. The operations can further comprise determining a current channel viewing map based on channel change requests during a current time period; comparing the current channel viewing map with the list of predicted channels; and generating a new channel viewing map, responsive to a decision to generate the new channel viewing map in accordance with detecting a change in the ranking based on the comparing.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a server (herein referred to as server 630). The server 630 can use computing and communication technology to perform functions which can include, among other things, data collection, data training and decision making as described by methods 400-500 of FIGS. 4-5. For instance, functions of server 630 can be similar to the functions described for RG 120 in accordance with methods 400-500. The media processors 606 and wireless communication devices 616 can be provisioned with software functions to utilize the services of server 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
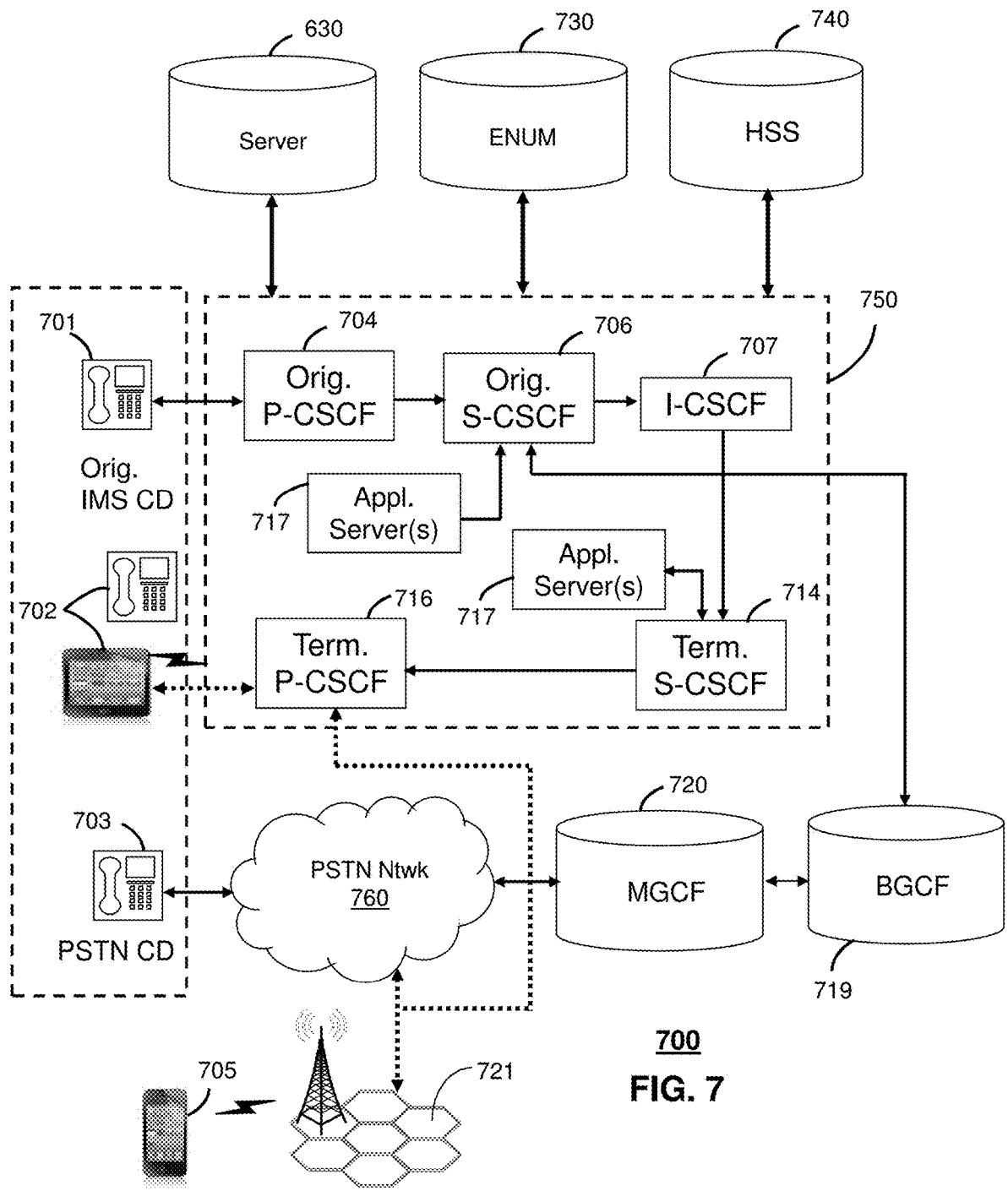

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with the system of FIG. 1 and communication system 600 as another representative embodiment of communication system 600. In particular, communication system 700 can include a non-transitory machine-readable medium comprising executable instructions that, when executed by a processing system including a processor, facilitate performance of operations. The operations can comprise obtaining channel change data for a media processor coupled to a gateway, the channel change data relating to channel changes requested via the media processor during each of a plurality of predefined recurring time periods. The operations can also comprise determining a channel viewing profile for the media processor, based on the channel change data, and generating a neural network for the media processor and the time periods; each node of the network comprises a channel viewing map corresponding to a portion of the channel viewing profile for a time period of the plurality of time periods, the node accordingly comprising a list of predicted channels likely to be requested during a subsequent occurrence of the time period, the predicted channels comprising a portion of channels available at the media processor, the list having a ranking of the predicted channels according to a likelihood of being requested during the subsequent occurrence of the time period. The operations can also comprise providing signals to the media processor corresponding to the predicted channels, each of the predicted channels thereby being available for an instant channel change responsive to a channel change request. The operations can further comprise determining a current channel viewing map based on channel change requests during a current time period; comparing the current channel viewing map with the list of predicted channels; and generating a new channel viewing map, responsive to a decision to generate the new channel viewing map in accordance with detecting a change in the ranking based on the comparing.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to communication system 700 for purposes similar to those described above. Server 630 can perform data training and decision making functions similar to the functions described for the RG of FIG. 1 in accordance with methods 400-500 of FIGS. 4-5. CDs 701, 702, 703 and 705 can be adapted with software to utilize the services of the server 630, similar to the functions described for devices shown in FIG. 1, in accordance with methods 400-500 of FIGS. 4-5. Server 630 can be an integral part of the application server(s) 717, performing functions substantially similar to functions of the AI system of FIG. 1 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
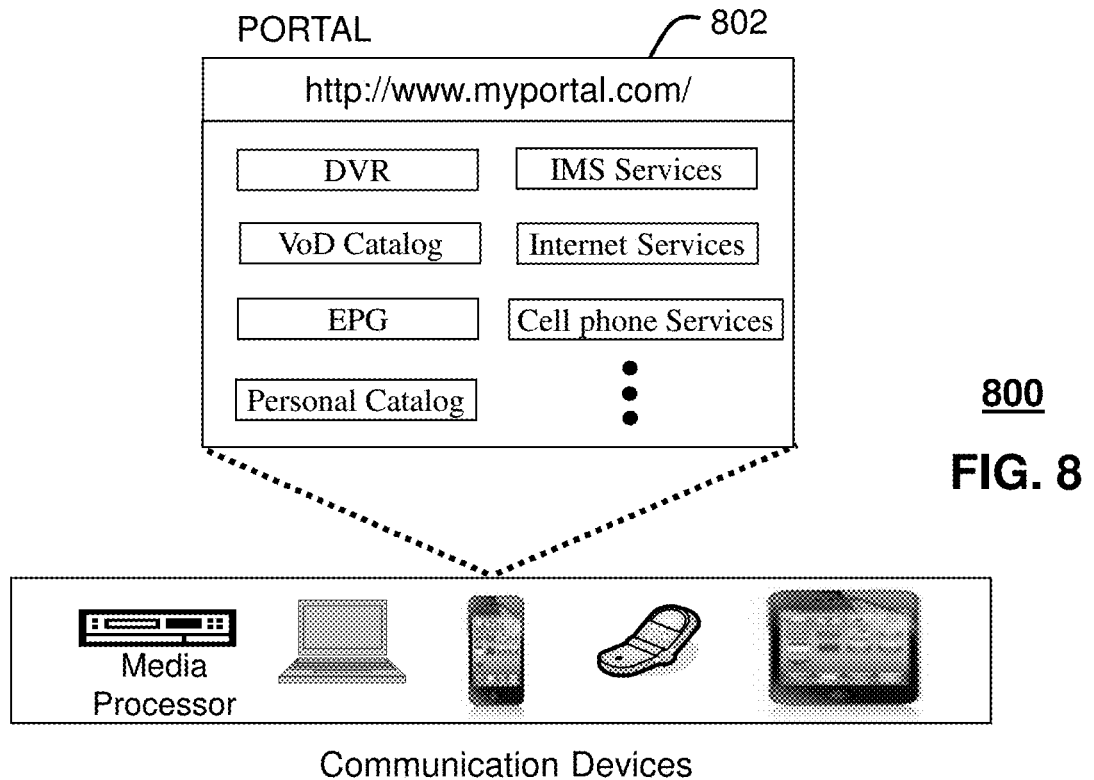
FIG. 8 depicts an illustrative embodiment of a web portal for interacting with the communication systems of FIGS. 1, 6 and 7.

FIG. 8 depicts an illustrative embodiment of a web portal 802 of a communication system 800. Communication system 800 can be overlaid or operably coupled with the system of FIG. 1, communication system 600, and/or communication system 700 as another representative embodiment of the system of FIG. 1, communication system 600, and/or communication system 700. The web portal 802 can be used for managing services of the system of FIG. 1 and communication systems 600-700. A web page of the web portal 802 can be accessed by a Uniform Resource Locator (URL) with an Internet browser using an Internet-capable communication device such as those described in FIG. 1 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications as may be desired by subscribers and/or service providers of the system of FIG. 1 and communication systems 600-700. For instance, users of the services provided by RG 120 server 630 can log into on-line accounts and provision the AI system at RG 120 or server 630 with customized channel change criteria (for example, changing the minimum stay time for a channel, or automatically assigning a higher rank to one or more channels in the channel viewing map), and so on. Service providers can log onto an administrator account to provision, monitor and/or maintain the system of FIG. 1 or server 630.

Figure 9:
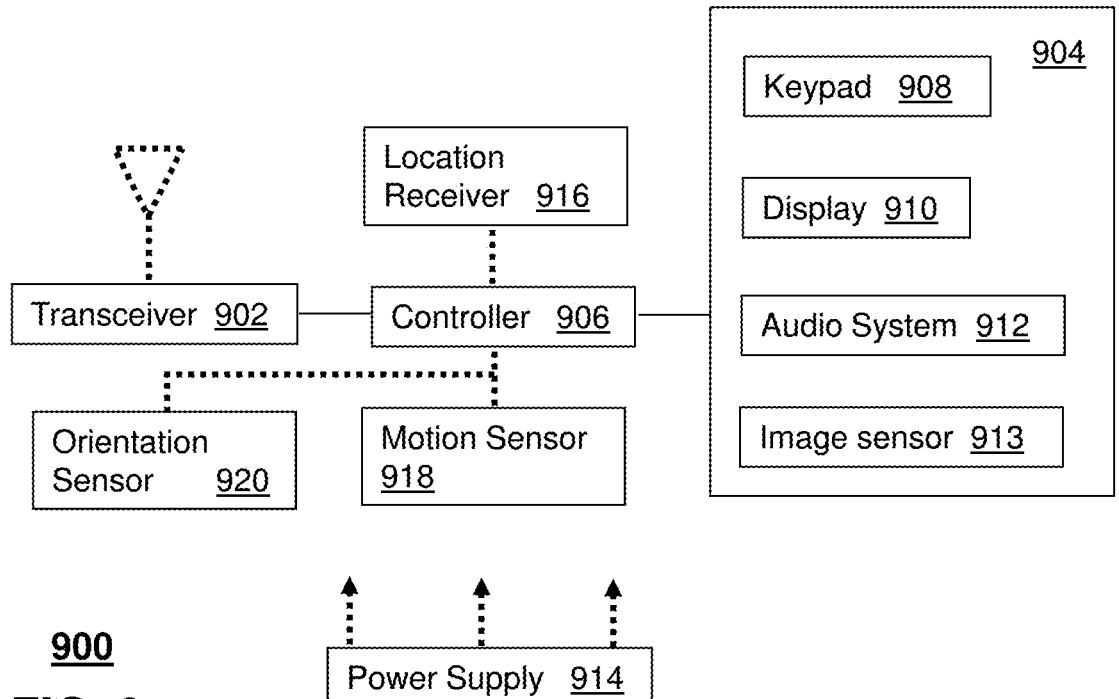
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIG. 1 and FIGS. 6-7 and can be configured to perform portions of methods 400-500 of FIGS. 4-5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices shown in FIG. 1, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in the system shown in FIG. 1 and in communication systems 600-700 of FIGS. 6-7, such as a gaming console and a media player. In addition, the controller 906 can be adapted in various embodiments to perform the functions of the data collection unit, the data training unit or the decision making unit, as described above.

Upon reviewing the aforementioned embodiments, it would be evident to an artisan with ordinary skill in the art that said embodiments can be modified, reduced, or enhanced without departing from the scope of the claims described below. For example, the AI system of the RG can access a wide variety of databases ("Big Data") based on preferences of the customer derived from the customer's channel viewing behavior, and offer additional services to the customer via the IPTV network. The RG may or may not be the only point of interface between the network and the STB at the customer premises. For example, the AI system (including one or more of the data collection unit, the data training unit, and the decision making unit) may be separate from the gateway and communicate separately with the STB. In addition, the AI system may be integrated with the STB, or else be located in the cloud and communicate with the STB via a network. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
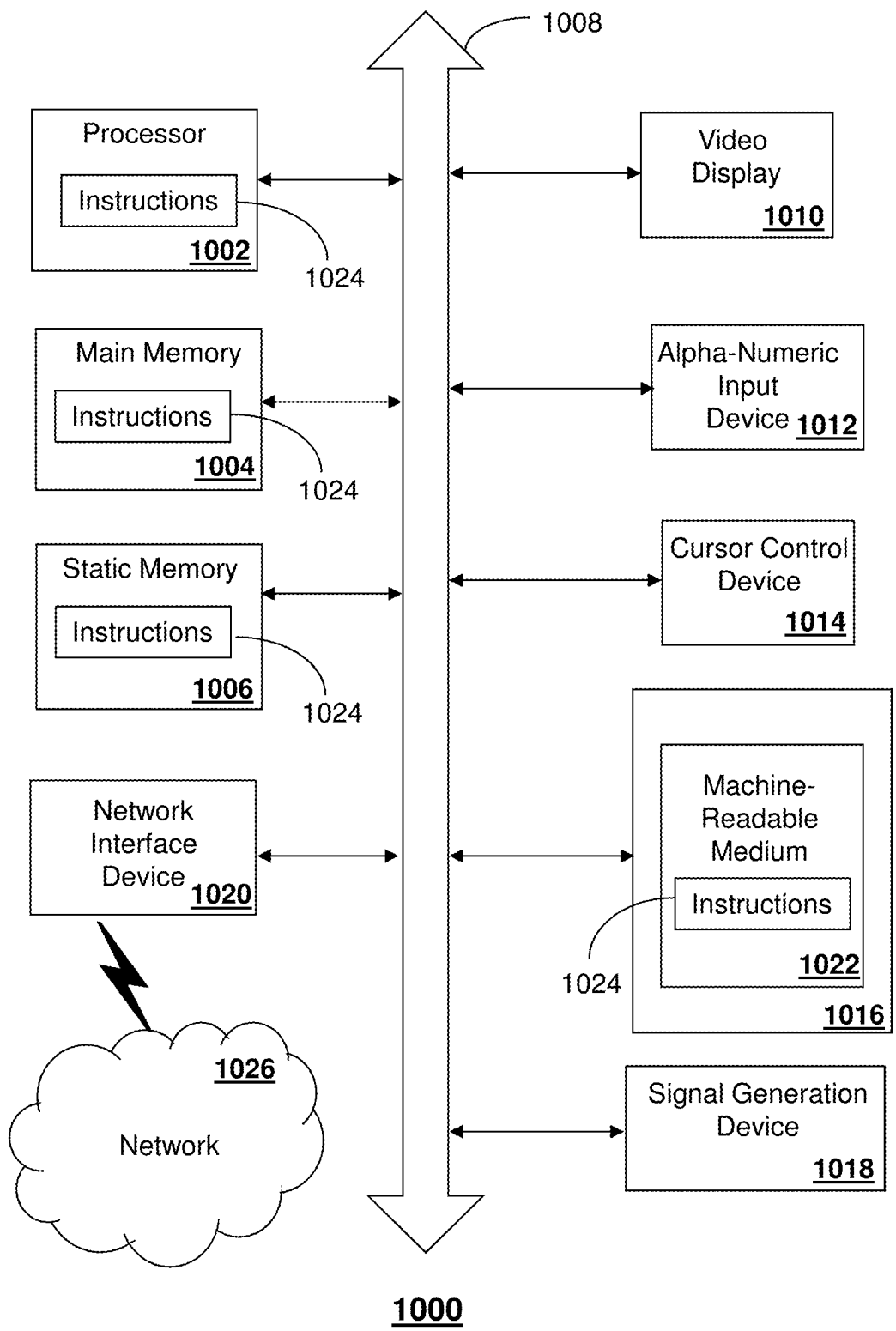
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 630, the media processor 606, the RG 120, and other devices of FIG. 1. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    obtaining, by a processing system including a processor at a gateway, channel change data for a media processor coupled to the gateway, the channel change data relating to channel changes requested via the media processor during each of a plurality of predefined recurring time periods;
    recording, by the processing system, the channel change data to obtain recorded channel change data, wherein a channel change request is recorded only for a channel that is subsequently viewed for at least a predetermined minimum stay time;
    determining, by the processing system, a channel viewing profile for the media processor, based on the recorded channel change data;
    generating, by the processing system, a channel viewing map corresponding to a portion of the channel viewing profile for a time period of the plurality of predefined recurring time periods, the channel viewing map comprising a list of predicted channels likely to be requested during a subsequent occurrence of the time period, the list of predicted channels comprising a portion of channels available at the media processor, the list of predicted channels having a ranking for each predicted channel according to a likelihood of being requested during the subsequent occurrence of the time period, the ranking based on a total length of time each predicted channel in the list of predicted channels was viewed in at least one viewing period having a duration of at least the predetermined minimum stay time during previous occurrences of the time period;
    providing, by the processing system, signals to the media processor corresponding to the list of predicted channels, each predicted channel in the list of predicted channels thereby being available for a rapid channel change responsive to a channel change request;
    determining, by the processing system, a current channel viewing map based on channel change requests during a current time period;
    comparing, by the processing system, the current channel viewing map with the list of predicted channels; and
    generating, by the processing system, a new channel viewing map, responsive to a decision to generate the new channel viewing map responsive to a determination that the current channel viewing map does not correspond to the list of predicted channels based on the channel change requests during the current time period, the decision being made using a fuzzy-logic decision-making procedure.

2. The method of claim 1, wherein the media processor receives media services via the gateway from a media provider system.

3. The method of claim 2, wherein the media services are provided in accordance with a service level of a subscription to the media provider system.

4. The method of claim 1, wherein the generating the channel viewing map comprises generating a trainable network for the media processor and the plurality of predefined recurring time periods, wherein each node of the network corresponds to a time period of the plurality of predefined recurring time periods and comprises the list of predicted channels for the time period, and wherein the network trains according to channel change data for the plurality of predefined recurring time periods.

5. The method of claim 1, wherein the channel viewing map comprises a number of distribution servers predicted to be required for delivering the signals to the media processor during the time period.

6. The method of claim 1, wherein the time period is a portion of a day of a week, the time period accordingly recurring weekly.

7. The method of claim 6, wherein the day comprises a plurality of unequal time periods.

8. The method of claim 1, wherein each predicted channel of the list of predicted channels is associated with a predicted channel change time, the predicted channel change time being within the time period.

9. The method of claim 8, further comprising providing, by the processing system, one of a predicted channel from the list of predicted channels at the predicted channel change time associated with the one of the predicted channel, in advance of a customer request for the one of the predicted channel.

10. The method of claim 9, wherein the one of the predicted channel has a highest ranking of the list of predicted channels.

11. A device, comprising:
    a processing system including a processor; and
    a memory that stores executable instructions that, when executed by the processing system, facilitate performance of operations comprising:

obtaining channel change data for a media processor coupled to a gateway, the channel change data relating to channel changes requested via the media processor during each of a plurality of predefined recurring time periods;
recording the channel change data to obtain recorded channel change data, wherein a channel change request is recorded only for a channel that is subsequently viewed for at least a predetermined minimum stay time;
determining a channel viewing profile for the media processor, based on the channel change data;
generating a trainable network for the media processor and the time periods, wherein each node of the network comprises a channel viewing map corresponding to a portion of the channel viewing profile for a time period of the plurality of predefined recurring time periods, the node accordingly comprising a list of predicted channels likely to be requested during a subsequent occurrence of the time period, the predicted channels comprising a portion of channels available at the media processor, the list of predicted channels having a ranking for each predicted channel according to a likelihood of being requested during the subsequent occurrence of the time period, the ranking based on a total length of time each predicted channel in the list of predicted channels was viewed in at least one viewing period having a duration of at least the predetermined minimum stay time during previous occurrences of the time period, and wherein the network trains according to channel change data for the plurality of predefined recurring time periods;
providing signals to the media processor corresponding to the list of predicted channels, each predicted channel the list of predicted channels thereby being available for a rapid channel change responsive to a channel change request;
determining a current channel viewing map based on channel change requests during a current time period;
comparing the current channel viewing map with the list of predicted channels; and
generating a new channel viewing map, responsive to a determination that the current channel viewing map does not correspond to the list of predicted channels based on the channel change requests during the current time period, the determination being made using a fuzzy-logic decision-making procedure.

12. The device of claim 11, wherein the media processor receives media services via the gateway from a media provider system in accordance with a service level of a subscription to the media provider system.

13. The device of claim 11, wherein each node of the network corresponds to a time period of the plurality of predefined recurring time periods and comprises the list of predicted channels for the time period.

14. The device of claim 11, wherein the time period is a portion of a day of a week, the time period accordingly recurring weekly.

15. The device of claim 11, wherein each predicted channel of the list of predicted channels is associated with a predicted channel change time, the predicted channel change time being within the time period.

16. The device of claim 15, wherein the operations further comprise providing one of a predicted channel from the list of predicted channels at the predicted channel change time associated with the one of the predicted channel, in advance of a customer request for the one of the predicted channel.

17. A non-transitory machine-readable medium comprising executable instructions that, when executed by a processing system including a processor, facilitate performance of operations comprising:
obtaining channel change data for a media processor coupled to a gateway, the channel change data relating to channel changes requested via the media processor during each of a plurality of time periods;
recording the channel change data to obtain recorded channel change data, wherein a channel change request is recorded only for a channel that is subsequently viewed for at least a predetermined minimum stay time;
determining a channel viewing profile for the media processor, based on the channel change data;
generating a trainable network for the media processor and the time periods, wherein each node of the network comprises a channel viewing map corresponding to a portion of the channel viewing profile for a time period of the plurality of time periods, the node accordingly comprising a list of predicted channels likely to be requested during a subsequent occurrence of the time period, the list of predicted channels comprising a portion of channels available at the media processor, the list of predicted channels having a ranking for each predicted channel according to a likelihood of being requested during the subsequent occurrence of the time period, the ranking based on a total length of time each predicted channel in the list of predicted channels was viewed and a number of times each predicted channel in the list of predicted channels was viewed in at least one viewing period having a duration of at least the predetermined minimum stay time during previous occurrences of the time period, and wherein the network trains according to channel change data for the plurality of time periods;
providing signals to the media processor corresponding to the list of predicted channels, each predicted channel in the list of predicted channels thereby being available for a rapid channel change responsive to a channel change request;
determining a current channel viewing map based on channel change requests during a current time period;
comparing the current channel viewing map with the list of predicted channels; and
generating a new channel viewing map, responsive to a decision to generate the new channel viewing map responsive to a determination that the current channel viewing map does not correspond to the list of predicted channels based on the channel change requests during the current time period, the decision being made using a fuzzy-logic decision-making procedure.

18. The non-transitory machine-readable medium of claim 17, wherein the media processor receives media services via the gateway from a media provider system in accordance with a service level of a subscription to the media provider system.

19. The non-transitory machine-readable medium of claim 17, wherein each predicted channel of the list of predicted channels is associated with a predicted channel change time, the predicted channel change time being within the time period, and wherein the plurality of time periods comprise a plurality of predefined recurring time periods.

20. The non-transitory machine-readable medium of claim 19, wherein the operations further comprise providing one of a predicted channel from the list of predicted channels at the predicted channel change time associated with the one of the predicted channel, in advance of a customer request for the one of the predicted channel.

* * * * *